(12) United States Patent  (10) Patent No.: US 7,948,438 B1
Francis  (45) Date of Patent: May 24, 2011

(54) DETERMINING THE ANGLE OF ARRIVAL OF A TARGET SIGNAL RECEIVED BY AN ARRAY OF ANTENNA ELEMENTS

(75) Inventor: James Covosso Francis, Honeoye Falls, NY (US)

(73) Assignee: L-3 Services, Inc., San Diego, CA (US)

( * ) Notice: Subject to any disclaimer, the term of this patent is extended or adjusted under 35 U.S.C. 154(b) by 301 days.

(21) Appl. No.: 12/366,881

(22) Filed: Feb. 6, 2009

(51) Int. Cl.
*G01S 5/02* (2010.01)

(52) U.S. Cl. ...................................................... 342/417

(58) Field of Classification Search .................... 342/417
See application file for complete search history.

(56) References Cited

U.S. PATENT DOCUMENTS

| 4,754,282 A | * | 6/1988 | Edelblute et al. | 342/417 |
| 6,934,626 B2 | * | 8/2005 | Tingley | 701/207 |

FOREIGN PATENT DOCUMENTS

SG  200804442-2  * 5/2008

* cited by examiner

*Primary Examiner* — Thomas H Tarcza
*Assistant Examiner* — Frank McGue
(74) *Attorney, Agent, or Firm* — Edward W. Callan

(57) ABSTRACT

In a system for determining the angle of arrival of a target signal received by an array of antenna elements, a receiver obtains observations of a received target signal from an array of antenna elements; and a computer processes the obtained observations of the target signal with estimates of a target signal for different angles of arrival of a target signal received by the array of antenna elements to determine that the angle of arrival of the target signal is an angle of arrival at which dissimilarity between the observations of target signal and the estimates of the target signal for the different angles of arrival is minimized.

17 Claims, 2 Drawing Sheets

DETERMINING THE ANGLE OF ARRIVAL OF A TARGET SIGNAL RECEIVED BY AN ARRAY OF ANTENNA ELEMENTS

BACKGROUND OF THE INVENTION

The present invention generally pertains to determining the angle of arrival (AOA) of a target signal received by an array of antenna elements.

Arrays of antenna elements are commonly used in a system for estimating the AOA of a received target signal. For tactical signal-intercept applications it is desirable for the signal-intercept hardware to be of minimal size, weight, and power (SWAP). To realize minimal SWAP it is desirable to use a single tuner and to commutate the antenna elements of the array.

SUMMARY OF THE INVENTION

The present invention provides improved methods of determining the angle of arrival of a target signal received by an array of antenna elements, comprising the steps of:

(a) with a receiver, obtaining observations of a received target signal from an array of antenna elements; and (b) with a computer, processing the obtained observations of the target signal with estimates of a target signal for different angles of arrival of a target signal received by the array of antenna elements to determine that the angle of arrival of the target signal is an angle of arrival at which dissimilarity between the observations of target signal and the estimates of the target signal for the different angles of arrival is minimized.

In one aspect, step (b) comprises the step of:

(c) determining the angle of arrival $\phi$ by using the equation:

$$\phi = \mathrm{argmin}_\phi \|y - \delta A'x\|^2$$

wherein y is an observation of the target signal obtained from the individual elements of an array of antenna elements, and $\delta A'x$ is an estimate of a target signal received by a set of antenna elements for a particular angle of arrival.

In another aspect, step (b) comprises the step of:

(c) determining the angle of arrival $\phi$ by using the equation:

$$\phi = \mathrm{argmax}_\phi \{y^* A \tilde{x}\}$$

wherein y is an observation of the target signal obtained from a set of antenna elements, wherein $\tilde{x} = (A^*A)^{-1}A^*y$, with $\tilde{x}$ denoting least-squares optimality;

wherein the target signal is estimated as $\delta$ times a linear combination of sin(t)/t translates, which in matrix form is written as $\delta A'\tilde{x}$, wherein $\delta$ is a diagonal matrix incorporating equations for the array of antenna elements, $$\delta = \begin{pmatrix} e^{i\psi_0} & & & & & \\ & \ddots & & & & \\ & & e^{i\psi_0} & & & \\ & & & e^{i\psi_1} & & \\ & & & & \ddots & \\ & & & & & e^{i\psi_1} \\ & & & & & & \ddots \end{pmatrix}$$

wherein with each $e^{i\psi_k}$ block has a length equal to the number of samples that a receiver coupled to the array obtains from an individual antenna element, and wherein $A^*A = (\delta A')^* \delta A' = A'^* \delta^* \delta A'$.

The present invention additionally provides a system for performing the above-described method and computer readable storage media including computer executable program instructions for causing one or more computers to perform and/or enable the steps of the respective above-described method.

Additional features of the present invention are described with reference to the detailed description.

translates represents an unknown target signal that is band-limited. The $k^{th}$ curve from the left is the $k^{th}$ column of A' (The leftmost curve is the first column of A').

DETAILED DESCRIPTION

Figure 1:
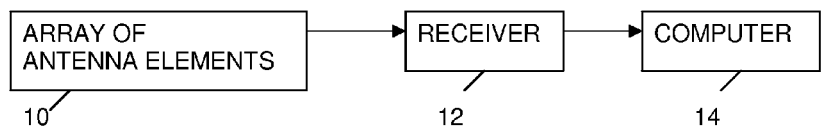
FIG. 1 is a block diagram of an exemplary system in which the method of the present invention is performed.

Referring to FIG. 1, an exemplary system in which the method of the present invention is performed includes an array of antenna elements 10, a receiver 12 and a computer 14. The computer 14 contains a digital signal processor and computer readable storage media that includes computer executable program instructions for causing the computer to perform and/or enable the various processing steps that are described herein. These instructions are stored in the computer readable storage media of the computer when the computer is manufactured and/or upon being downloaded via the Internet or from a portable computer readable storage media containing such instructions.

Figure 2:
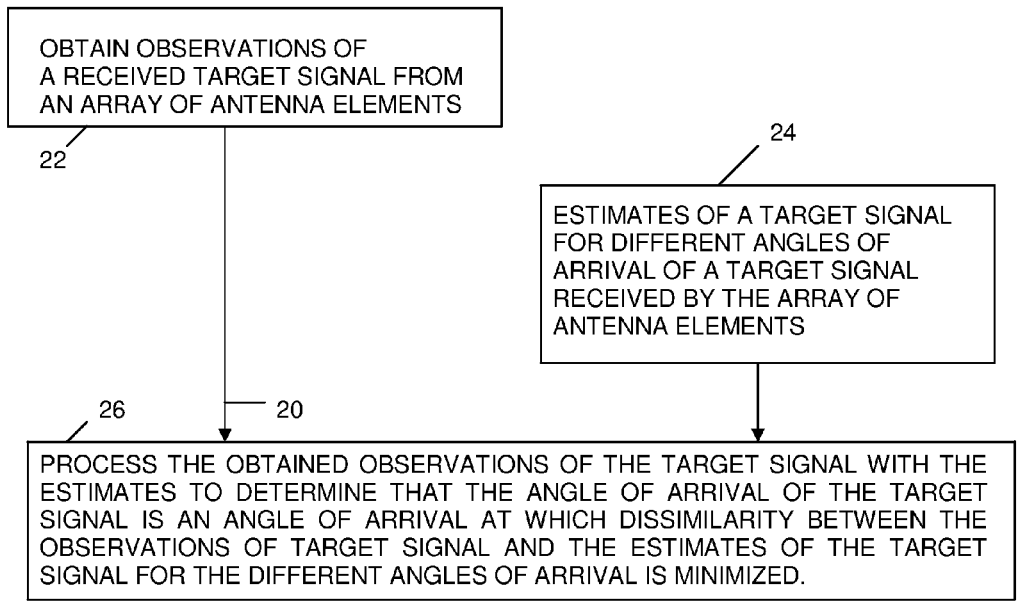
FIG. 2 is a diagram generally showing the method of the present invention.

Referring to FIGS. 1 and 2, observations 20 of the target signal received by the array of antenna elements 10 are obtained by the receiver 12, as shown at 22. It is assumed that the observations 20 of the received target signal are observed in zero-mean additive white Gaussian noise (AWGN).

The observations 20 are obtained at different times, at different frequencies and/or by using different CDMA signal access codes. The observations 20 are obtained from a set of antenna elements of the array of antenna elements 10. In an exemplary embodiment, the observations 20 are obtained from a set of elements of a commutated antenna array 10.

Each observation includes a plurality of samples of the received target signal that are taken over an interval that is a reciprocal of the bandwidth of the target signal. In an exemplary embodiment, the number of samples taken over each observation interval is one-hundred. In other embodiments, other numbers of samples are taken during each observation interval.

Estimates 24 of a target signal for different angles of arrival of receipt of a target signal by the array of antenna elements 10 are stored in the computer 14.

The observations 20 of the received target signal are processed by the computer 14 with the estimates 24, as shown at 26, to determine that the angle of arrival of the target signal is an angle of arrival at which dissimilarity between the observations 20 of target signal and the estimates 24 of the target signal for the different angles of arrival is minimized.

An observation of a received target signal is the product of a bandlimited target signal and the respective equation for a particular set of antenna elements in the array of antenna elements when the target signal is observed in AWGN. The observation of the bandlimited target signal arises from the channel impulse response convolved with a modulated target signal, and the antenna equation depends upon the angle of arrival (AOA) and perhaps other parameters.

A received signal of unknown bandwidth is estimated as $\delta$ times a linear combination of $\sin(t)/t$ translates, which in matrix form is written as $\delta A'x$. For example, with mid and high-band antennas (i.e. phased arrays), $\delta$ is a diagonal matrix incorporating equations for the array of antenna elements, $$\delta = \begin{pmatrix} e^{i\psi_0} & & & & & \\ & \ddots & & & & \\ & & e^{i\psi_0} & & & \\ & & & e^{i\psi_1} & & \\ & & & & \ddots & \\ & & & & & e^{i\psi_1} \\ & & & & & & \ddots \end{pmatrix} \quad \text{[Eq. 1]}$$

wherein with each $e^{i\psi_k}$ block has a length equal to the number of samples that a receiver coupled to the array obtains from an individual antenna element.

The $\sin(t)/t$ translates are windowed for different modulation bandwidths.

Figure 3:
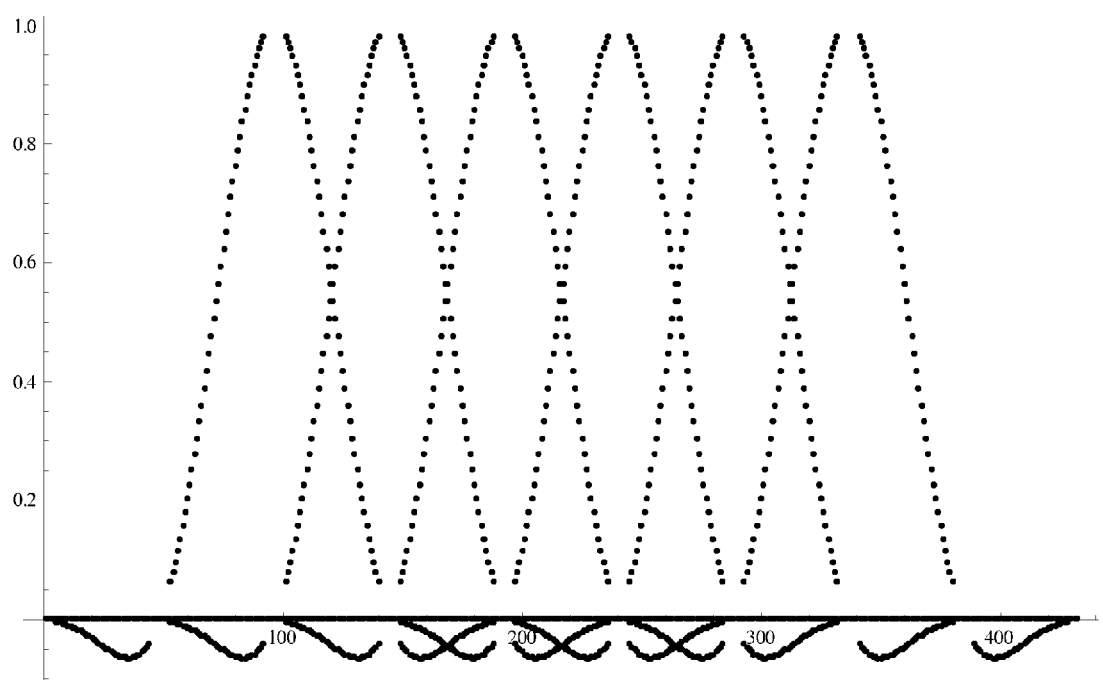
FIG. 3 is a diagram showing the columns of a matrix A', in which a linear combination of $$\frac{\sin(t)}{t}$$

A' may be seen graphically in FIG. 3. The $k^{th}$ curve from the left is the $k^{th}$ column of A'. The leftmost curve is the first column of A'.

With $\beta$ as the bandwidth of the unknown bandlimited target signal, it has been previously demonstrated that the length of time that the receiver 12 samples a single element of the array 10 should be approximately the reciprocal of $\beta$.

For a received signal y that is observed in AWGN, the angle of arrival $\phi$ can be determined as, $$\phi = \text{argmin}_\phi \|y - \delta A'x\|^2 \quad \text{[Eq. 2]}$$

Alternatively, for a received signal y that is observed in AWGN, the angle of arrival $\phi$ can be determined as, $$\phi = \text{argmax}_\phi \{y^* A\tilde{x}\} \quad \text{[Eq. 3]}$$

where $$\tilde{x} = (A^*A)^{-1} A^* y \quad \text{[Eq. 4]}$$

wherein denotes least-squares optimality.

An efficient algorithm is constructed for use in computing Equations 3 and 4. In particular, consider first the structure of $A^*A$. $A^*A$ is Hermitian. A is complex matrix in general, but $A^*A = (\delta A')^* \delta A' = A'^* \delta^* \delta A'$ is a purely real matrix as $\delta^* \delta$ is a purely real matrix. Thus $A^*A$ is a purely real symmetric matrix. Additionally, as practical matter the $$\frac{\sin(t)}{t}$$

translates that are the columns of A' may be windowed. Referring again to FIG. 3, it is seen that each $$\frac{\sin(t)}{t}$$

translate has been windowed and is zero beyond the second null from the center. Thus two columns of A' that are sufficiently separated have no nonzero overlap and their inner product is zero. Multiplication by $\delta$ does not make zero elements nonzero, so these same two columns of $A = \delta A'$ have a zero inner product. Therefore, $A^*A$ is banded and the width of the band is determined by the length of the window on the $$\frac{\sin(t)}{t}$$

translates. Thus with A', as in FIG. 3, $A^*A$ is a purely real symmetric matrix that is banded, and the width of the band is $2+1+2=5$ elements. $A^*A$ may be factored using an LU decomposition, so that $A^*A = LDU$ where L is lower triangular with 1 on the diagonal, D is a diagonal, and U is upper triangular with 1 on the diagonal. LDU is symmetric, as $A^*A$ is symmetric. Thus, $$LDU = (LDU)^T = U^T D^T L^T = U^T D L^T. \quad \text{[Eq. 5]}$$

Since $U^T$ is lower triangular with 1 on the diagonal it may be concluded that $$L = U^T. \quad \text{[Eq. 6]}$$

U, or rather DU, may be obtained by applying simple Gaussian Elimination to $A^*A$. This does not destroy the banded structure of $A^*A$, and it follows that U is also banded with the same width. Additionally, $A^*A$ is positive-definite, whereby pivoting is unnecessary, and it is only necessary to apply Gaussian Elimination to $A^*A$, as $$L = U^T. \quad \text{[Eq. 7]}$$

Referring again to Equation 4, this may be regarded as, $$A^*A\tilde{x} = A^*y. \quad \text{[Eq. 8]}$$

For the computation of $A^*y$, A is sparse, whereby $A^*y$ can be computed efficiently and easily.

Using the LU decomposition (where U is obtained by simple Gaussian Elimination so that U is really DU) one obtains $$LU\tilde{x} = A^*y. \quad \text{[Eq. 9]}$$

This may be performed as, $$Lv = A^*y \quad \text{[Eq. 10]}$$

and then as, $$U\tilde{x} = v. \quad \text{[Eq. 11]}$$

L is lower triangular and banded, so that computing $Lv = A^*y$ is efficient. Similarly, U is upper triangular and banded, so that computing $U\tilde{x} = v$ is efficient.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of determining the angle of arrival of a target signal received by an array of antenna elements, comprising the steps of:
   (a) with a receiver, obtaining observations of a received target signal from an array of antenna elements; and
   (b) with a computer, processing the obtained observations of the target signal with estimates of a target signal for different angles of arrival of a target signal received by the array of antenna elements to determine that the angle of arrival of the target signal is an angle of arrival at which dissimilarity between the observations of target signal and the estimates of the target signal for the different angles of arrival is minimized;
   wherein step (b) comprises the step of:
   (c) determining the angle of arrival $\phi$ by using the equation:

$$\phi = \mathrm{argmin}_\phi \| y - \delta A'x \|^2$$

wherein y is an observation of the target signal obtained from the individual elements of an array of antenna elements, and $\delta A'x$ is an estimate of a target signal received by a set of antenna elements for a particular angle of arrival.

2. A method according to claim 1, wherein the target signal is estimated as $\delta$ times a linear combination of $\sin(t)/t$ translates, which in matrix form is written as $\delta A'x$,
   wherein $\delta$ is a diagonal matrix incorporating equations for the array of antenna elements, $$\delta = \begin{pmatrix} e^{i\psi_0} & & & & & \\ & \ddots & & & & \\ & & e^{i\psi_0} & & & \\ & & & e^{i\psi_1} & & \\ & & & & \ddots & \\ & & & & & e^{i\psi_1} \\ & & & & & & \ddots \end{pmatrix}$$

wherein with each $e^{i\psi_k}$ block has a length equal to the number of samples that a receiver coupled to the array obtains from an individual antenna element.

3. A method according to claim 2, wherein the $\sin(t)/t$ translates are windowed for different modulation bandwidths.

4. A method of determining the angle of arrival of a target signal received by an array of antenna elements, comprising the steps of:
   (a) with a receiver, obtaining observations of a received target signal from an array of antenna elements; and
   (b) with a computer, processing the obtained observations of the target signal with estimates of a target signal for different angles of arrival of a target signal received by the array of antenna elements to determine that the angle of arrival of the target signal is an angle of arrival at which dissimilarity between the observations of target signal and the estimates of the target signal for the different angles of arrival is minimized;
   wherein step (b) comprises the step of:
   (c) determining the angle of arrival $\phi$ by using the equation:

$$\phi = \mathrm{argmax}_\phi \{ y^* A \tilde{x} \}$$

wherein y is an observation of the target signal obtained from a set of antenna elements,
   wherein $\tilde{x} = (A^*A)^{-1} A^* y$, with $\tilde{x}$ denoting least-squares optimality;
   wherein the target signal is estimated as $\delta$ times a linear combination of $\sin(t)/t$ translates, which in matrix form is written as $\delta A'\tilde{x}$,
   wherein $\delta$ is a diagonal matrix incorporating equations for the array of antenna elements, $$\delta = \begin{pmatrix} e^{i\psi_0} & & & & & \\ & \ddots & & & & \\ & & e^{i\psi_0} & & & \\ & & & e^{i\psi_1} & & \\ & & & & \ddots & \\ & & & & & e^{i\psi_1} \\ & & & & & & \ddots \end{pmatrix}$$

wherein with each $e^{i\psi_k}$ block has a length equal to the number of samples that a receiver coupled to the array obtains from an individual antenna element, and
   wherein $A^*A = (\delta A')^* \delta A' = A'^* \delta^* \delta A'$.

5. A method according to claim 4, wherein the $\sin(t)/t$ translates are windowed for different modulation bandwidths.

6. A method according to claim 4, wherein a factorization of $A^*A$ uses that $A^*A$ is banded.

7. A method according to claim 4, wherein for the computation of $A^*y$, A is sparse.

8. A system for determining the angle of arrival of a target signal received by an array of antenna elements, comprising:
   a receiver adapted for obtaining observations of a received target signal from an array of antenna elements; and
   a computer that is programmed for processing the obtained observations of the target signal with estimates of a target signal for different angles of arrival of a target signal received by the array of antenna elements to determine that the angle of arrival of the target signal is an angle of arrival at which dissimilarity between the observations of target signal and the estimates of the target signal for the different angles of arrival is minimized;
   wherein the angle of arrival $\phi$ is determined by using the equation:

$$\phi = \mathrm{argmin}_\phi \| y - \delta A'x \|^2$$

wherein y is an observation of the target signal obtained from the individual elements of an array of antenna elements, and $\delta A'x$ is an estimate of a target signal received by a set of antenna elements for a particular angle of arrival.

9. A computer system according to claim 8, wherein the target signal is estimated as $\delta$ times a linear combination of $\sin(t)/t$ translates, which in matrix form is written as $\delta A'x$,
   wherein $\delta$ is a diagonal matrix incorporating equations for the array of antenna elements, $$\delta = \begin{pmatrix} e^{i\psi_0} & & & & & \\ & \ddots & & & & \\ & & e^{i\psi_0} & & & \\ & & & e^{i\psi_1} & & \\ & & & & \ddots & \\ & & & & & e^{i\psi_1} \\ & & & & & & \ddots \end{pmatrix}$$

wherein with each $e^{i\psi_k}$ block has a length equal to the number of samples that a receiver coupled to the array obtains from an individual antenna element.

10. A system for determining the angle of arrival of a target signal received by an array of antenna elements, comprising:
   a receiver adapted for obtaining observations of a received target signal from an array of antenna elements; and
   a computer that is programmed for processing the obtained observations of the target signal with estimates of a target signal for different angles of arrival of a target signal received by the array of antenna elements to determine that the angle of arrival of the target signal is an angle of arrival at which dissimilarity between the observations of target signal and the estimates of the target signal for the different angles of arrival is minimized;
   wherein the angle of arrival $\phi$ is determined by using the equation:

$$\phi = \mathrm{argmax}_\phi \{y^* A \tilde{x}\}$$

wherein y is an observation of the target signal obtained from a set of antenna elements,
   wherein $\tilde{x} = (A^*A)^{-1}A^*y$, with $\tilde{x}$ denoting least-squares optimality;
   wherein the target signal is estimated as $\delta$ times a linear combination of $\sin(t)/t$ translates, which in matrix form is written as $\delta A' \tilde{x}$,
wherein $\delta$ is a diagonal matrix incorporating equations for the array of antenna elements, $$\delta = \begin{pmatrix} e^{i\psi_0} & & & & & \\ & \ddots & & & & \\ & & e^{i\psi_0} & & & \\ & & & e^{i\psi_1} & & \\ & & & & \ddots & \\ & & & & & e^{i\psi_1} \\ & & & & & & \ddots \end{pmatrix}$$

wherein with each $e^{i\psi_k}$ block has a length equal to the number of samples that a receiver coupled to the array obtains from an individual antenna element, and
   wherein $A^*A = (\delta A')^* \delta A' = A'^* \delta^* \delta A'$.

11. A nontransitory computer readable storage medium for use with a computer in a system for determining the angle of arrival of a target signal received by an array of antenna elements, wherein the system comprises: a receiver adapted for obtaining observations of a received target signal from the array of antenna elements; and a computer,
   wherein the computer readable storage medium contains computer executable program instructions for causing the computer to perform the step of:
   (a) processing the obtained observations of the target with estimates of a target signal for different angles of arrival of a target signal received by the array of antenna elements to determine that the angle of arrival of the target signal is an angle of arrival at which dissimilarity between the observations of target signal and the estimates of the target signal for the different angles of arrival is minimized;
   wherein step (a) comprises the step of:
   (b) determining the angle of arrival $\phi$ by using the equation:

$$\phi = \mathrm{argmin}_\phi \|y - \delta A' x\|^2$$

wherein y is an observation of the target signal obtained from the individual elements of an array of antenna elements, and
   $\delta A'x$ is an estimate of a target signal received by a set of antenna elements for a particular angle of arrival.

12. A computer readable storage medium according to claim 11, wherein the target signal is estimated as $\delta$ times a linear combination of $\sin(t)/t$ translates, which in matrix form is written as $\delta A'x$,
   wherein $\delta$ is a diagonal matrix incorporating equations for the array of antenna elements, $$\delta = \begin{pmatrix} e^{i\psi_0} & & & & & \\ & \ddots & & & & \\ & & e^{i\psi_0} & & & \\ & & & e^{i\psi_1} & & \\ & & & & \ddots & \\ & & & & & e^{i\psi_1} \\ & & & & & & \ddots \end{pmatrix}$$

wherein with each $e^{i\psi_k}$ block has a length equal to the number of samples that a receiver coupled to the array obtains from an individual antenna element.

13. A computer readable storage medium according to claim 12, wherein the $\sin(t)/t$ translates are windowed for different modulation bandwidths.

14. A nontransitory computer readable storage medium for use with a computer in a system for determining the angle of arrival of a target signal received by an array of antenna elements, wherein the system comprises: a receiver adapted for obtaining observations of a received target signal from the array of antenna elements; and a computer,
   wherein the computer readable storage medium contains computer executable program instructions for causing the computer to perform the step of:
   (a) processing the obtained observations of the target signal with estimates of a target signal for different angles of arrival of a target signal received by the array of antenna elements to determine that the angle of arrival of the target signal is an angle of arrival at which dissimilarity between the observations of target signal and the estimates of the target signal for the different angles of arrival is minimized;
   wherein step (a) comprises the step of:
   (b) determining the angle of arrival $\phi$ by using the equation:

$$\phi = \mathrm{argmax}_\phi \{y^* A \tilde{x}\}$$

wherein y is an observation of the target signal obtained from a set of antenna elements,
   wherein $\tilde{x} = (A^*A)^{-1}A^*y$, with $\tilde{x}$ denoting least-squares optimality;
   wherein the target signal is estimated as $\delta$ times a linear combination of $\sin(t)/t$ translates, which in matrix form is written as $\delta A' \tilde{x}$,
   wherein $\delta$ is a diagonal matrix incorporating equations for the array of antenna elements, $$\delta = \begin{pmatrix} e^{i\psi_0} & & & & & \\ & \ddots & & & & \\ & & e^{i\psi_0} & & & \\ & & & e^{i\psi_1} & & \\ & & & & \ddots & \\ & & & & & e^{i\psi_1} \\ & & & & & & \ddots \end{pmatrix}$$

wherein with each $e^{i\psi_k}$ k block has a length equal to the number of samples that a receiver coupled to the array obtains from an individual antenna element, and wherein $A*A=(\delta A')*\delta A'=A'*\delta*\delta A'$.

15. A computer readable storage medium according to claim 14, wherein the sin(t)/t translates are windowed for different modulation bandwidths.

16. A computer readable storage medium according to claim 14, wherein a factorization of A*A uses that A*A is banded.

17. A computer readable storage medium according to claim 14, wherein for the computation of A*y, A is sparse.

* * * * *

UNITED STATES PATENT AND TRADEMARK OFFICE
CERTIFICATE OF CORRECTION

| | | |
|---|---|---|
| PATENT NO. | : 7,948,438 B1 | Page 1 of 1 |
| APPLICATION NO. | : 12/366881 | |
| DATED | : May 24, 2011 | |
| INVENTOR(S) | : James Covosso Francis | |

It is certified that error appears in the above-identified patent and that said Letters Patent is hereby corrected as shown below:

at column 3, line 47, in Equation 4 the "subtraction" sign should be an -- = -- sign
at column 3, line 48, after "wherein" insert -- "$\bar{x}$" --
at column 7, line 51, insert --signal-- after "target"

Signed and Sealed this
Eighteenth Day of October, 2011

David J. Kappos
*Director of the United States Patent and Trademark Office*